(12) United States Patent
White (10) Patent No.: US 11,810,057 B2
(45) Date of Patent: Nov. 7, 2023

(54) METHOD, APPARATUS, AND COMPUTER PROGRAM PRODUCT FOR VANTAGE VIEW ASSISTANCE

(71) Applicant: HERE GLOBAL B.V., Eindhoven (NL)

(72) Inventor: Donta White, Racine, WI (US)

(73) Assignee: HERE GLOBAL B.V., Eindhoven (NL)

(*) Notice: Subject to any disclaimer, the term of this patent is extended or adjusted under 35 U.S.C. 154(b) by 338 days.

(21) Appl. No.: 17/168,975

(22) Filed: Feb. 5, 2021

(65) Prior Publication Data
US 2022/0253803 A1 Aug. 11, 2022

(51) Int. Cl.
*G06Q 10/0835* (2023.01)
*G06Q 50/30* (2012.01)
*G08G 5/00* (2006.01)

(52) U.S. Cl.
CPC ....... *G06Q 10/08355* (2013.01); *G06Q 50/30* (2013.01); *G08G 5/0008* (2013.01); *G08G 5/0021* (2013.01); *G08G 5/0039* (2013.01); *G08G 5/0069* (2013.01)

(58) Field of Classification Search
CPC ............. G06Q 10/08355; G06Q 50/30; G08G 5/0008; G08G 5/0021; G08G 5/0039; G08G 5/0069
See application file for complete search history.

(56) References Cited

U.S. PATENT DOCUMENTS

| | | | |
|---|---|---|---|
| 9,524,648 B1 | 12/2016 | Gopalakrishnan et al. | |
| 10,163,315 B2 | 12/2018 | Staszel | |
| 2016/0330534 A1* | 11/2016 | White, Jr. | ........... H04L 12/2825 |
| 2017/0364095 A1* | 12/2017 | Wang | ........................ G06T 7/73 |
| 2018/0049575 A1 | 2/2018 | Yamrick | |
| 2018/0107211 A1* | 4/2018 | Schubert | .............. G08G 5/0021 |
| 2019/0256088 A1 | 8/2019 | Sharma et al. | |
| 2019/0384317 A1* | 12/2019 | Lee | ...................... G05D 1/0246 |
| 2020/0039373 A1* | 2/2020 | Cantrell | .................. B60L 53/38 |

FOREIGN PATENT DOCUMENTS

WO    WO-2018/0183869    10/2019

* cited by examiner

*Primary Examiner* — Shon G Foley
(74) *Attorney, Agent, or Firm* — ALSTON & BIRD LLP (57) ABSTRACT

A method is provided for using sensor sources near a target destination to identify conflicts with an approach plan to the target destination, and more particularly, to soliciting sensor data from sensor sources having the target destination within their field of view to identify conflicts with an approach plan to the target destination. Methods may include: identifying a vehicle approaching a target destination with a target destination delivery plan for an article; identifying at least one sensor source proximate the target destination; obtaining sensor data from the at least one sensor source proximate the target destination; determining, based on the sensor data from the at least one sensor source proximate the target destination, a conflict with the target destination delivery plan for the article; and causing the target destination delivery plan for the article to change in response to the conflict with the target destination delivery plan for the article.

20 Claims, 5 Drawing Sheets

METHOD, APPARATUS, AND COMPUTER PROGRAM PRODUCT FOR VANTAGE VIEW ASSISTANCE

TECHNOLOGICAL FIELD

An example embodiment of the present disclosure relates to using sensor sources near a target destination to identify conflicts with an approach plan to the target destination, and more particularly, to soliciting sensor data from sensor sources having the target destination within their field of view to identify conflicts with an approach plan to the target destination.

BACKGROUND

Transportation of people and objects from an origin to a destination has conventionally required a person to navigate and to facilitate the transportation. Transportation may include, for example, the delivery of one or more objects to a target destination. The increasing use of online retailers to purchase articles has further increased the need for efficient and effective transportation and delivery of objects to a recipient. This dramatic increase in shipping of objects has increased demand for vehicles and drivers to transport the objects from an origin to their destination. At the same time, with improvements to technology including sensor capabilities, data processing capabilities, and an improvement in reliability of sensor data and vehicle hardware, vehicle autonomy is ever improving and becoming more and more common. Vehicle autonomy includes semi-autonomous vehicles, such as vehicles with driver assistance features (e.g., lane-keep assist, collision alerts, automatic braking, etc.) and fully autonomous vehicles that do not require a driver to drive from an origin to a destination.

With the increasing requirements for delivery of objects to respective destinations, and the increasing adoption of autonomous vehicles, autonomous delivery vehicles and services are on the horizon. While vehicles delivering objects to their destination for the "final mile" are conventionally terrestrial vehicles, such as road-going cars and trucks, the use of aerial vehicles such as unmanned aerial vehicles (UAVs) or "drones" has been contemplated. However, as terrestrial autonomous vehicle delivery faces challenges, aerial autonomous vehicle delivery faces additional complications and challenges.

BRIEF SUMMARY

A method, apparatus, and computer program product are provided in accordance with an example embodiment for using sensor sources near a target destination to identify conflicts with an approach plan to the target destination, and more particularly, to soliciting sensor data from sensor sources having the target destination within their field of view to identify conflicts with an approach plan to the target destination. Embodiments provided herein include an apparatus having processing circuitry and at least one memory including computer program code, the at least one memory and the computer program code configured to, with the processing circuitry, cause the apparatus to at least: identify a vehicle approaching a target destination with a target destination delivery plan for an article; identify at least one sensor source proximate the target destination; obtain sensor data from the at least one sensor source proximate the target destination; determine, based on the sensor data from the at least one sensor source proximate the target destination, a conflict with the target destination delivery plan for the article; and cause the target destination delivery plan for the article to change in response to the conflict with the target destination delivery plan.

According to an example embodiment, causing the apparatus to identify the vehicle approaching the target destination includes causing the apparatus to identify the vehicle coming within a predetermined distance of the target destination. The vehicle may include an aerial drone, where the at least one sensor source proximate the target destination includes at least one additional aerial drone proximate the target destination. Causing the apparatus of some embodiments to identify the at least one sensor source proximate the target destination may include causing the apparatus to alert the at least one sensor source proximate the target destination of the target destination and capture sensor data from the at least one sensor source of the target destination and an environment of the target destination. Causing the apparatus to cause the target destination delivery plan for the article to change may include causing the apparatus to: generate a new delivery plan for the article; and cause the vehicle to implement the new delivery plan for the article.

According to some embodiments, causing the apparatus to identify the at least one sensor source proximate the target destination may include causing the apparatus to identify at least one sensor source proximate the target destination having sensor capabilities satisfying predetermined criteria. Causing the apparatus of some embodiments to identify the at least one sensor source proximate the target destination may include causing the apparatus to identify a plurality of sensor sources proximate the target destination based, at least in part, on the identified plurality of sensor sources providing a plurality of perspectives of the target destination. Causing the apparatus of some embodiments to obtain sensor data from the at least one sensor source proximate the target destination may include causing the apparatus to provide credit to the at least one sensor source proximate the destination.

Embodiments disclosed herein provide a computer program product including at least one non-transitory computer-readable storage medium having computer-executable program code instructions stored therein, the computer-executable program code portions including program code instructions configured to: identify a vehicle approaching a target destination with a target destination delivery plan for an article; identify at least one sensor source proximate the target destination; obtain sensor data from the at least one sensor source proximate the target destination; determine, based on the sensor data from the at least one sensor source proximate the target destination, a conflict with the target destination delivery plan for the article; and cause the target destination delivery plan for the article to change in response to the conflict with the target destination delivery plan for the article.

The program code instructions to identify the vehicle approaching the target destination may include program code instructions to identify the vehicle coming within a predetermined distance of the target destination. The vehicle may include an aerial drone, and the at least one sensor source proximate the target destination may include at least one additional aerial drone proximate the target destination. The program code instructions to identify the at least one sensor source proximate the target destination may include program code instructions to alert the at least one sensor source proximate the target destination of the target destination and capture sensor data from the at least one sensor source of the target destination and an environment of the target destination. The program code instructions to determine the conflict with the target destination delivery plan for the article may include program code instructions to identify a threat to the vehicle or to the article proximate the target destination.

According to an example embodiment, the program code instructions to cause the target destination delivery plan for the article to change may include program code instructions to generate a new delivery plan for the article, and cause the vehicle to implement the new delivery plan for the article. The program code instructions to identify the at least one sensor source proximate the target destination may include program code instructions to identify at least one sensor source proximate the target destination having sensor capabilities satisfying predetermined criteria. The program code instructions to identify the at least one sensor source proximate the target destination may include program code instructions to identify a plurality of sensor sources proximate the target destination based, at least in part, on the identified plurality of sensor sources providing a plurality of perspectives of the target destination. The program code instructions to obtain sensor data from the at least one sensor source proximate the target destination may further include program code instructions to provide credit to the at least one sensor source proximate the target destination.

Embodiments provided herein include a method including: identifying a vehicle approaching a target destination with a target destination delivery plan for an article; identifying at least one sensor source proximate the target destination; obtaining sensor data from the at least one sensor source proximate the target destination; determining, based on the sensor data from the at least one sensor source proximate the target destination, a conflict with the target destination delivery plan for the article; and causing the target destination delivery plan for the article to change in response to the conflict with the target destination delivery plan for the article. Identifying the vehicle approaching the target destination may include identifying the vehicle coming within a predetermined distance of the target destination. The vehicle of some embodiments includes an aerial drone, and the at least one sensor source proximate the target destination includes at least one additional aerial drone proximate the target. Identifying the at least one sensor source proximate the target destination my include alerting the at least one sensor source proximate the target destination of the target destination and capturing sensor data from the at least one sensor source of the target destination and an environment of the target destination. Determining the conflict with the target destination delivery plan for the article may include identifying a threat to the vehicle or to the article proximate the target destination.

Causing the target destination delivery plan for the article to change may include generating a new delivery plan for the article and causing the vehicle to implement the new delivery plan for the article. Identifying the at least one sensor source proximate the target destination may include identifying at least one sensor source proximate the target destination having sensor capabilities satisfying the predetermined criteria. Identifying the at least one sensor source proximate the target destination may include identifying a plurality of sensor sources proximate the target destination based, at least in part, on the identified plurality of sensor sources providing a plurality of perspectives of the target destination. Obtaining sensor data from the at least one sensor source proximate the target destination may include providing credit to the at least one sensor source proximate the target destination in response to obtaining sensor data from the at least one sensor source proximate the target destination.

Embodiments provided herein include an apparatus including: means for identifying a vehicle approaching a target destination with a target destination delivery plan for an article; means for identifying at least one sensor source proximate the target destination; means for obtaining sensor data from the at least one sensor source proximate the target destination; means for determining, based on the sensor data from the at least one sensor source proximate the target destination, a conflict with the target destination delivery plan for the article; and means for causing the target destination delivery plan for the article to change in response to the conflict with the target destination delivery plan for the article. The means for identifying the vehicle approaching the target destination may include means for identifying the vehicle coming within a predetermined distance of the target destination.

The vehicle of some embodiments includes an aerial drone, and the at least one sensor source proximate the target destination includes at least one additional aerial drone proximate the target. The means for identifying the at least one sensor source proximate the target destination my include means for alerting the at least one sensor source proximate the target destination of the target destination and capturing sensor data from the at least one sensor source of the target destination and an environment of the target destination. The means for determining the conflict with the target destination delivery plan for the article may include means for identifying a threat to the vehicle or to the article proximate the target destination.

The means for causing the target destination delivery plan for the article to change may include means for generating a new delivery plan for the article and means for causing the vehicle to implement the new delivery plan for the article. The means for identifying the at least one sensor source proximate the target destination may include means for identifying at least one sensor source proximate the target destination having sensor capabilities satisfying the predetermined criteria. The means for identifying the at least one sensor source proximate the target destination may include means for identifying a plurality of sensor sources proximate the target destination based, at least in part, on the identified plurality of sensor sources providing a plurality of perspectives of the target destination. The means for obtaining sensor data from the at least one sensor source proximate the target destination may include means for providing credit to the at least one sensor source proximate the target destination in response to obtaining sensor data from the at least one sensor source proximate the target destination.

BRIEF DESCRIPTION OF THE DRAWINGS

Having thus described example embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present disclosure.

A method, apparatus, and computer program product are provided herein in accordance with an example embodiment for to using sensor sources near a target destination to identify conflicts with an approach plan to the target destination, and more particularly, to soliciting sensor data from sensor sources having the target destination within their field of view to identify conflicts with an approach plan to the target destination. The arrival of vehicles at their destination for delivery of an article (e.g., a particular item, object, or even person) may be of critical importance to satisfy a delivery task for the vehicle. Regardless of the article, delivery to a predefined target destination may be the delivery task for a vehicle. This delivery task may be hindered by a variety of obstructions, threats, or conflicts including environmental issues, environmental threats (e.g., obstacles, barricades, projectiles, etc.) or bad actors, such as those endeavoring to interrupt the delivery task. Collectively these hinderances are referred to herein as conflicts as they potentially conflict with the successful completion of the delivery task.

Vehicles having manual control (e.g., a human driver of a car or a human controller of an aerial vehicle) may employ their human controller to monitor their environment for potential threats. Further, vehicles having manual control may employ sensors to aid the human controller to monitor their environment for threats, and to identify any potential conflicts with their delivery task. Fully autonomous vehicles may exclusively employ sensors to monitor their environment and to identify conflicts that may interfere with their delivery task at a target destination. The sensors employed by a vehicle to monitor their environment and the environment of a target destination for conflicts may include proximity sensors, image sensors, temperature sensors (e.g., infrared sensors), Light Distancing and Ranging (LiDAR) sensors, RADAR sensors, etc. Further, vehicles may monitor traffic through service providers, such as a map data service provider that can provide indications of traffic, weather, or other environmental conditions.

While a vehicle may be able to monitor their environment and identify conflicts relative to a target destination that may impact their delivery task, such monitoring and sensing capabilities may be enhanced through the use of other sources of sensor data or sensor sources proximate the vehicle and/or the target destination. A vehicle approaching a target destination may benefit from sensor data gathered by other sensors having different vantage points and different fields-of-view of the target destination. Sensor sources may include stationary sensors, such as image sensors in fixed locations, such as on a building, that monitor a particular field of vision. Sensor sources may also include dynamic sources, such as drones or aerial vehicles. These aerial drones may be unmanned aerial vehicles (e.g., fully autonomous), manually controlled aerial vehicles, or semi-autonomous aerial vehicles, where a human provides some control (e.g., a path) while the semi-autonomous aerial vehicle navigates the path itself. These aerial vehicles are collectively referred to herein as aerial drones.

Aerial drones used as sensor sources may include a variety of aerial drone types having different aerial drone functions. For example, a fleet of aerial drones may be deployed for monitoring an area, where the aerial drones are configured (autonomously or semi-autonomously) to patrol a predefined geographic area, follow a predefined patrol path, or to remain substantially stationary in an aerial position for monitoring of an area. Other types of aerial drones may be aerial drones conducting deliveries such that they are transiting through an area and may gather sensor data while in that area. Still further, some aerial drones may be deployed for the purpose of security, such as escort drones configured to follow and monitor delivery tasks of delivery drones. These escort drones may be employed by a delivery service that is also employing the delivery drones, or optionally, the escort drones may be third-party escort drones from a security service designed to ensure the security of delivery tasks for which they are contracted.

Aerial drones may function as sensor sources to provide a relatively inexpensive method of gathering sensor data and to facilitate the successful completion of delivery tasks as described herein. Beyond aerial drones, sensor sources may include stationary sensor sources such as the image sensors attached to buildings, as described above. Sensor sources may also be vehicle mounted to terrestrial vehicles, such as cars, trucks, buses, etc. The sensor source may be any sensor capable of providing sensor data regarding the target destination of the vehicle.

Embodiments described herein provide a method of using sensor data from sensor sources that are capable of gathering sensor data relating to the target destination of a vehicle. The gathered sensor data may be used to alter a delivery plan for delivery of an article to the target destination. The sensor data gathered from the sensor sources may be combined with sensor data from the vehicle to identify any conflicts for the delivery plan. The determination of a conflict for the delivery plan may be performed at the vehicle making the delivery or at a server, for example, where the server gathers sensor data from the sensor sources proximate the target destination for evaluation as to whether a conflict exists.

Figure 1:
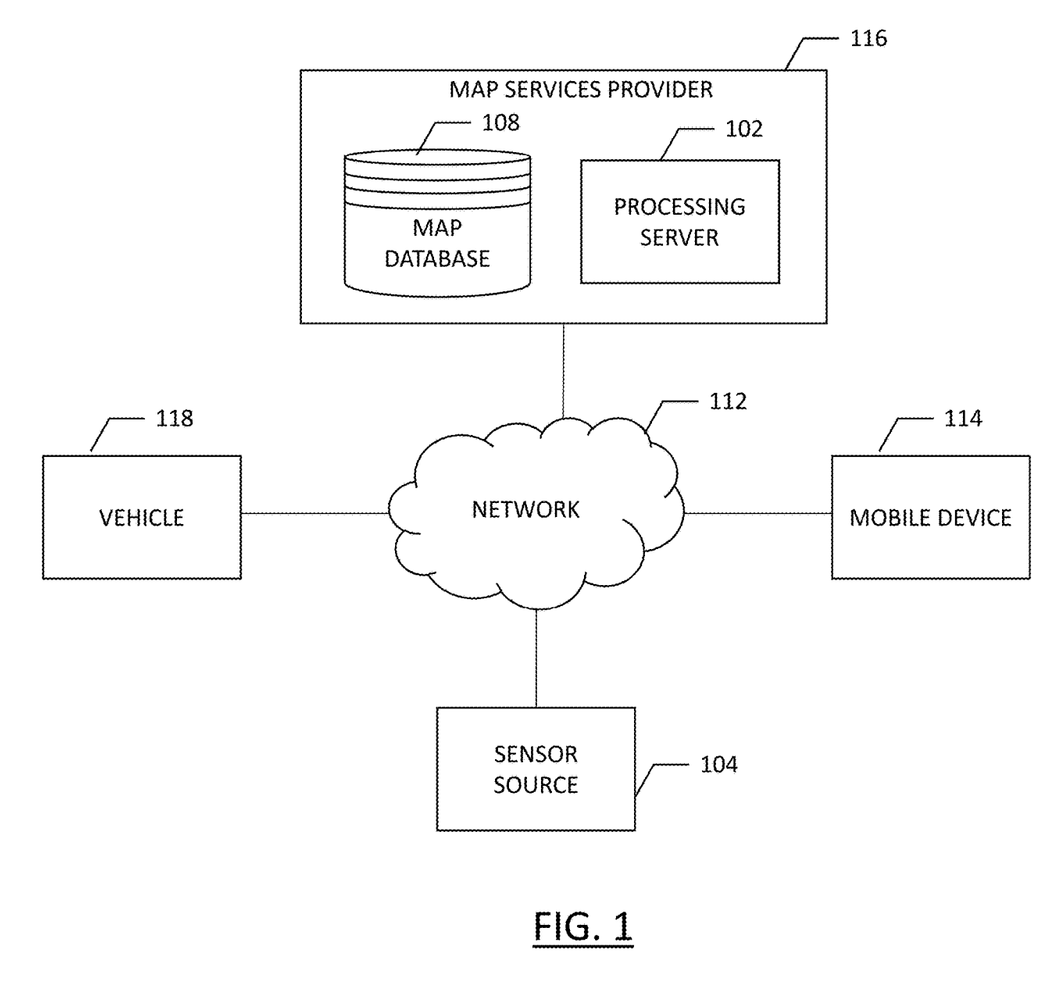
FIG. 1 illustrates a communications diagram in accordance with an example embodiment of the present disclosure.

FIG. 1 illustrates a communication diagram of an example embodiment of a system for implementing example embodiments described herein. The illustrated embodiment of FIG. 1 includes a map services provider 116, a processing server 102 in data communication a geographic map database, e.g., map database 108 through a network 112, and one or more mobile devices 114. The mobile device 114 may be associated, coupled, or otherwise integrated with a vehicle 118, such as an aerial drone as described above or an aerial vehicle such as a helicopter. The mobile device 114 may optionally integrated as, for example, a navigation unit in an aerial vehicle, such as in a manned helicopter airplane, dirigible balloon, airship, or the like. Additional, different, or fewer components may be provided. For example, many mobile devices 114 and/or vehicles 118 may connect with the network 112. The map services provider 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

Embodiments described herein may be implemented in autonomous, semi-autonomous, or non-autonomous vehicles. Autonomous vehicles may include vehicles that are guided entirely by software and hardware components, without requiring human interaction. Non-autonomous vehicles are vehicles that have no autonomy and require a human driver or pilot to perform all driving activities. Semi-autonomous vehicles are vehicles that fall anywhere between autonomous and non-autonomous vehicles, where there is some degree of autonomy, which may include any form of driver aid or pilot aid such as steering assistance, acceleration/deceleration assistance, adaptive cruise control, auto-pilot, etc. Autonomous vehicle routing may include causing the autonomous vehicle to follow a selected route, while a semi-autonomous or non-autonomous vehicle routing may involve providing navigational assistance or route guidance to a user to drive a vehicle along a selected route or to pilot an aerial vehicle along a route. Further, in the case of unmanned vehicles, a driver or pilot may not be within the vehicle, but may be located remotely, where the driver or pilot is associated with the mobile device 114 which may be located remotely from the vehicle 118.

Processing server 102 may be one or more fixed or mobile computing devices. The mobile device 114 may be configured to access the map database 108 via the processing server 102 through, for example, a mapping application, such that the user equipment may provide navigational assistance to a user among other services provided through access to the map services provider 116.

For terrestrial vehicles, such as cars, trucks, etc., the map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The links or roadways may be represented by polylines, where each polyline comprises a plurality of vertices establishing the path of the roadway geometry. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

With respect to aerial vehicles, such as unmanned drones, helicopters, airplanes, airships, etc., the map database 108 may include a multi-dimensional map including terrain information and object information, where the object information may include information regarding the location and size of objects extending above ground level, where the objects may be in uncontrolled airspace, and where the object information may include a height above ground level of at least some of the objects and an altitude of the ground level of a respective area. Terrain information may include information such as terrain elevation, terrain type (e.g., land, water, type of terrain such as heavily treed, lightly treed, meadow, sand, wetland, etc.), and permissions associated with the terrain. Permissions associated with an area may include ownership such as public lands or private lands, with an indication of whether landing of an aerial vehicle is allowed or possible, which may also depend on the type of aerial vehicle. The map database may also include information regarding roadways as described above, and points of interest, which may both be relevant to aerial vehicles. Points of interest may include buildings, structures, roadway overpasses, bridges, tunnels, etc. The three-dimensional characteristics of these points of interest may optionally be included in the map database, such as a building footprint and height, or specific profile, or a bridge height above the terrain or water below, or the elevation of any object that may extend above the ground level of the terrain.

Map database 108 may include information relevant to aerial vehicles that may not be relevant to terrestrial vehicles, such as object information regarding specific objects, such as trees, buildings, billboards, radio towers, etc. Information regarding these objects may include location information (relative to the terrain information, for example), size information (e.g., length and width on the ground), height above ground level information, and possibly other information relating to their impact on an aerial route above or around the object. The map database 108 may also include information relevant to aerial navigation, such as restricted airspace around airports, population hubs, sports arenas, train stations, gas stations, national parks, or other airspace that may be otherwise restricted. Further, some airspace restrictions may have a temporal component, such as sporting arenas which may only have restricted airspace during events, or geographic areas that have airspace restrictions based on dignitary travel or events, where those geographic areas typically do not have airspace restrictions. The map database 108 may be updated by governmental databases such as state or federal databases which update airspace restrictions periodically. Further, governmental regulations may be periodically updated and such updates may be cascaded to the map database, based on restrictions associated with different types of aircraft and different geographic locations.

The map database 108 may be maintained by a content provider e.g., a map developer. By way of example, the map services provider can collect geographic data to generate and enhance the map database 108. According to some embodiments, the map database 108 may delegate map generation and revision to other devices, such as mobile device 114. There can be different ways used by the map services provider to collect data. These ways can include obtaining data from other sources, such as municipalities or respective geographic authorities. In addition, the map services provider can employ field personnel to travel by vehicle along roads throughout the geographic region to observe features and/or record information about them, for example. Also, remote sensing, such as aerial or satellite photography, can be used to generate map geometries directly or through machine learning as described herein. Aerial vehicles having sufficient sensor capability can further enhance the map database 108 by providing information relating to topography, building geometry, infrastructure geometry, etc.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by mobile device 114, for example. The navigation-related functions can correspond to vehicle navigation, pedestrian navigation, or other types of navigation. While example embodiments described herein generally relate to aerial travel to a target destination, example embodiments or components thereof may be implemented for vehicular travel along roadways, pedestrian travel along walkways, bicycle travel along bike paths, boat travel along maritime navigational routes, etc., each to reach a respective destination. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example. Optionally, a portion of the map database 108, such map data regarding a specific roadway, may be downloaded or stored temporarily on an end user device, and according to various embodiments described herein, the mobile device 114 may be configured to modify the map data regarding a roadway before sending the map data back to the map database 108.

The vehicle 118, which may be associated with mobile device 114 or have mobile device 114 integrated therein may be any type of vehicle, such as an unmanned aerial vehicle, a helicopter, airplane, airship, or the like. Further, embodiments or portions thereof may be implemented in terrestrial vehicles, such that vehicle 118 may be a road going vehicle.

The processing server 102 may receive probe data from a mobile device 114 or a device in communication with mobile device 114. The mobile device 114 may include one or more detectors or sensors as a positioning system built or embedded into or within the interior of the mobile device 114. Alternatively, the mobile device 114 uses communications signals for position determination. The mobile device 114, particularly when integrated with vehicle 118, may receive location data from a positioning system, such as a global positioning system (GPS), cellular tower location methods, access point communication fingerprinting, or the like. The server 102 may receive sensor data configured to describe a position of a mobile device, or a controller of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use the detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

Optionally, the vehicle 118 may include locating means such as a global positioning system, or other locating means as described above while mobile device 114 may be remotely located from the vehicle 118. The vehicle 118 may be capable of reporting location to the map services provider 116 and/or mobile device 114 for implementations of the embodiments described herein.

More specifically, probe data (e.g., collected by mobile device 114 and/or vehicle 118) is representative of the location of a vehicle 118 at a respective point in time and may be collected while a vehicle is moving or stationary. According to the example embodiment described below with the probe data being from aerial vehicles traveling above ground, the probe data may include, without limitation, location data, (e.g. a latitudinal, longitudinal position, and/or height/altitude, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114 and/or vehicle 118, may be or include any device capable of collecting the aforementioned probe data. Some examples may include specialized vehicle mapping equipment, navigational systems, mobile devices, such as phones or personal data assistants, or the like.

The sensor source(s) 104 may be a plurality of sensor sources that may be embodied as a single device or a plurality of different devices and may include any type of device capable of producing sensor data relating to the environment of a target destination or the environment proximate a target destination. The sensor source(s) 104 may include, as described above, any of a variety of sensor types (e.g., image sensors, thermal sensors, LiDAR sensors, RADAR sensors, proximity sensors, etc.) and may be stationary or dynamic. Stationary sensor sources may include sensor arrays attached to a building (e.g., security cameras, proximity sensors, etc.) while dynamic sensor sources may include sensors attached to mobile sources, such as aerial drones, terrestrial vehicles, mobile devices, etc. The sensor source(s) 104 may be in communication with network 112 for communication with the mobile device 114, vehicle 118, or directly with a map services provider 116.

Figure 2:
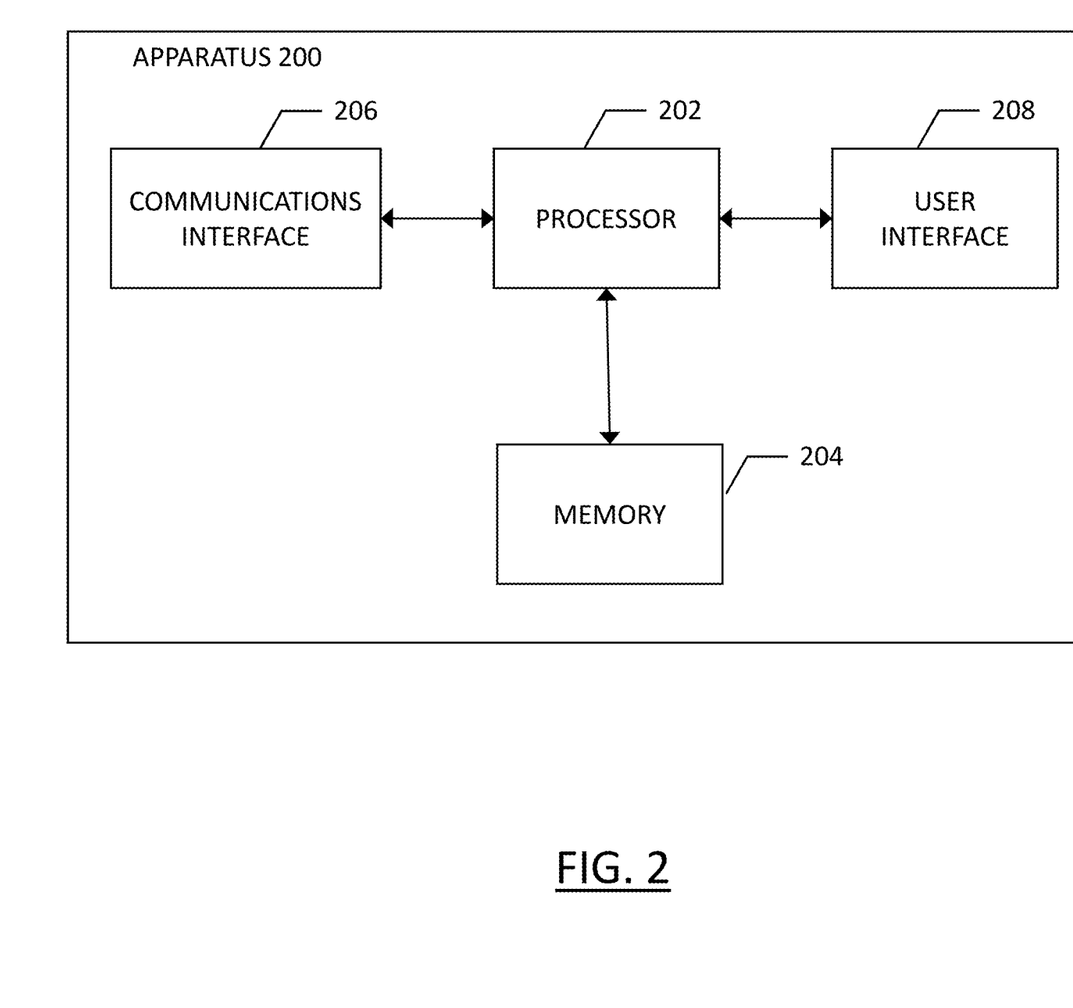
FIG. 2 is a block diagram of an apparatus that may be specifically configured for using sensor sources near a target destination to identify conflicts with an approach plan to the target destination in accordance with an example embodiment of the present disclosure.

An example embodiment of a processing server 102 may be embodied in an apparatus 200 as illustrated in FIG. 2. The apparatus 200, such as that shown in FIG. 2, may be specifically configured in accordance with an example embodiment of the present disclosure for using sensor sources near a target destination to identify conflicts with an approach plan to the target destination, and more particularly, to soliciting sensor data from sensor sources having the target destination within their field of view to identify conflicts with an approach plan to the target destination. The apparatus 200, which may be embodied in the vehicle 118, mobile device 114, or sensor source(s) 104 may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus 200. The memory device 204 may be non-transitory and may include, for example, one or more volatile and/or non-volatile memories. In other words, for example, the memory device 204 may be an electronic storage device (for example, a computer readable storage medium) comprising gates configured to store data (for example, bits) that may be retrievable by a machine (for example, a computing device like the processor 202). The memory device 204 may be configured to store information, data, content, applications, instructions, or the like, for enabling the apparatus 200 to carry out various functions in accordance with an example embodiment of the present invention. For example, the memory device 204 could be configured to buffer input data for processing by the processor. Additionally or alternatively, the memory device 204 could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment of a mobile device 114 or vehicle 118 capable of performing methods described herein may also include a communication interface 206 that may be any means such as a device or circuitry embodied in either hardware or a combination of hardware and software that is configured to receive and/or transmit data to/from a communications device in communication with the apparatus, such as to facilitate communications with one or more mobile devices 114 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Aerial vehicle travel has evolved from airplanes and helicopters that typically travel well above the altitude at which they would encounter ground-based objects to aerial vehicles that can travel at very low altitudes where terrestrial objects are present. Features described herein use a multi-dimensional map to facilitate safe navigation above the ground, but below conventionally controlled airspace such as that defined by the United States Federal Aviation Authority, the European Joint Aviation Authority, or similar national authority protected airspace for commercial airline traffic. More specifically, embodiments described herein are well suited for relatively low-altitude aerial drones that fly below a designated ceiling above which commercial air traffic may be present. Such flight at relatively low altitudes includes travel in airspace where objects extend upward from the ground, such as houses, buildings, radio towers, etc., such as just above ground level, up to around two thousand feet depending upon the height of the tallest buildings, towers, and geographic features within a region.

Aerial vehicle travel by manned airplane typically is performed at high altitudes above the earth where there are no obstructions to flight other than other aircraft. The safety of travel via airplane is governed by strict air traffic control protocols in controlled airspace. Controlled airspace is airspace of defined dimensions within which Air Traffic Control (ATC) services are provided. The level of control varies with different classes of airspace. Uncontrolled airspace is the opposite of controlled airspace. The international Civil Aviation Organization (ICAO) classifies airspace in seven classes from A to G. Controlled airspace is in classes A to E, in order of decreasing ATC regulation of flights. Uncontrolled airspace includes classes F and G. Outside of emergency situations, the only time ground obstructions may be a factor are times when an airplane is departing or arriving at an airport. Obstructions near such locations are strictly regulated and any obstructions, even temporary ones, which may affect safe air travel are charted to notify pilots of their locations and potential issues.

Embodiments described herein may involve the flight of unmanned aircraft systems (UAS) in uncontrolled airspace. As used herein, UAS uncontrolled airspace generally refers to airspace in classes F or G, and in an area where ground obstructions are normally present. This UAS uncontrolled airspace is airspace in which manned commercial aircraft typically do not fly, such as between buildings or a matter of feet above treetops, for example. Manned aerial vehicles (such as fixed wing and variable wing) do not ordinarily travel in this type of UAS uncontrolled airspace, except possibly during takeoff or landing which may generally be performed in controlled airspace corridors for takeoff and landing, or perhaps military aircraft during combat and helicopters during police or medical emergencies, or helicopters associated with news stations.

Vehicle autonomy is becoming more prevalent with respect to terrestrial vehicles such as automobiles as automotive travel is somewhat well-suited for autonomous control. Automobiles generally travel along roadways of a network of roads in predefined lanes with predefined directions and operational limits (e.g., speed limits). The rules and regulations, together with the framework within which automobiles are operated provide conditions that can be accommodated by autonomous vehicle control. Aerial vehicle travel, particularly in the uncontrolled airspace that includes obstacles and terrain is less well defined and does not have predefined paths, directions, and other regulations and boundaries that make autonomous automotive control feasible. Thus, autonomous and semi-autonomous aerial vehicles such as aerial drones face unique challenges in navigating uncontrolled airspace.

Autonomous aerial vehicles or drones are becoming commonplace tools for different applications in different fields. While aerial drones have been used in military applications, such drones are typically small versions of fixed-wing aircraft that require substantial airspeed to create lift with their fixed wings. Drones as described herein are generally commercial in purpose and use rotary blades for motive force, where one or more rotary blades are used for vertical take-off and landing (VTOL) applications. These drones are used for photography (e.g., for listing property for sale), security (e.g., for patrolling an area), surveying property, etc. As technology improves, including battery or power source technology and motive force technology (e.g., propeller motors), drones may be used in further, far-reaching applications. Drones are scalable and can be configured to carry payloads. Payload carrying drones further expand the applications of drones and expand their use to transporting articles between locations. Drones used to transport and deliver articles face additional challenges in accomplishing their missions as they necessarily travel close to buildings and will generally deliver payloads to pedestrian-accessible locations, where people may be encountered during delivery.

Embodiments of the present disclosure facilitate the use of drones, particularly when they are employed to deliver payloads to a target destination. As described above, a drone may be capable of monitoring its surroundings and identifying objects and conflicts proximate the drone; however, the single point-of-view of a drone may not capture all objects and conflicts proximate the drone. Embodiments described herein employ sensor sources proximate a target destination for delivery of an article to function as additional vantage points thereby providing a more holistic view of the environment of a drone that is delivering an article to the target destination in order to alert or advise the drone of a conflict relative to a delivery plan of the drone.

A drone operating as a transport and delivery drone may collect a payload of an article at an origin. The drone then transports the article to a target destination for delivery. The target destination may be any type of location, from a front door of a residence to a rooftop landing pad, for example. The transport of the article may generally be performed without substantial conflict or issue. A drone may have sensor capability to navigate a path toward the target destination and to avoid obstacles or other aerial traffic along the way. Such drones may be fully-autonomous or semi-autonomous as described above, where a semi-autonomous drone may have some degree of human control during the transport and/or delivery of the article. While most of a route to a target destination may be navigable by a drone using its own sensor array, the last portion of the route or the "approach" to the target destination may be more complex.

Embodiments described herein identify sensor sources proximate the target destination when an aerial drone is on an approach to the target destination such that the sensor sources can provide different vantage views of the target destination in order to identify any conflicts with a delivery plan of the aerial drone.

Figure 3:
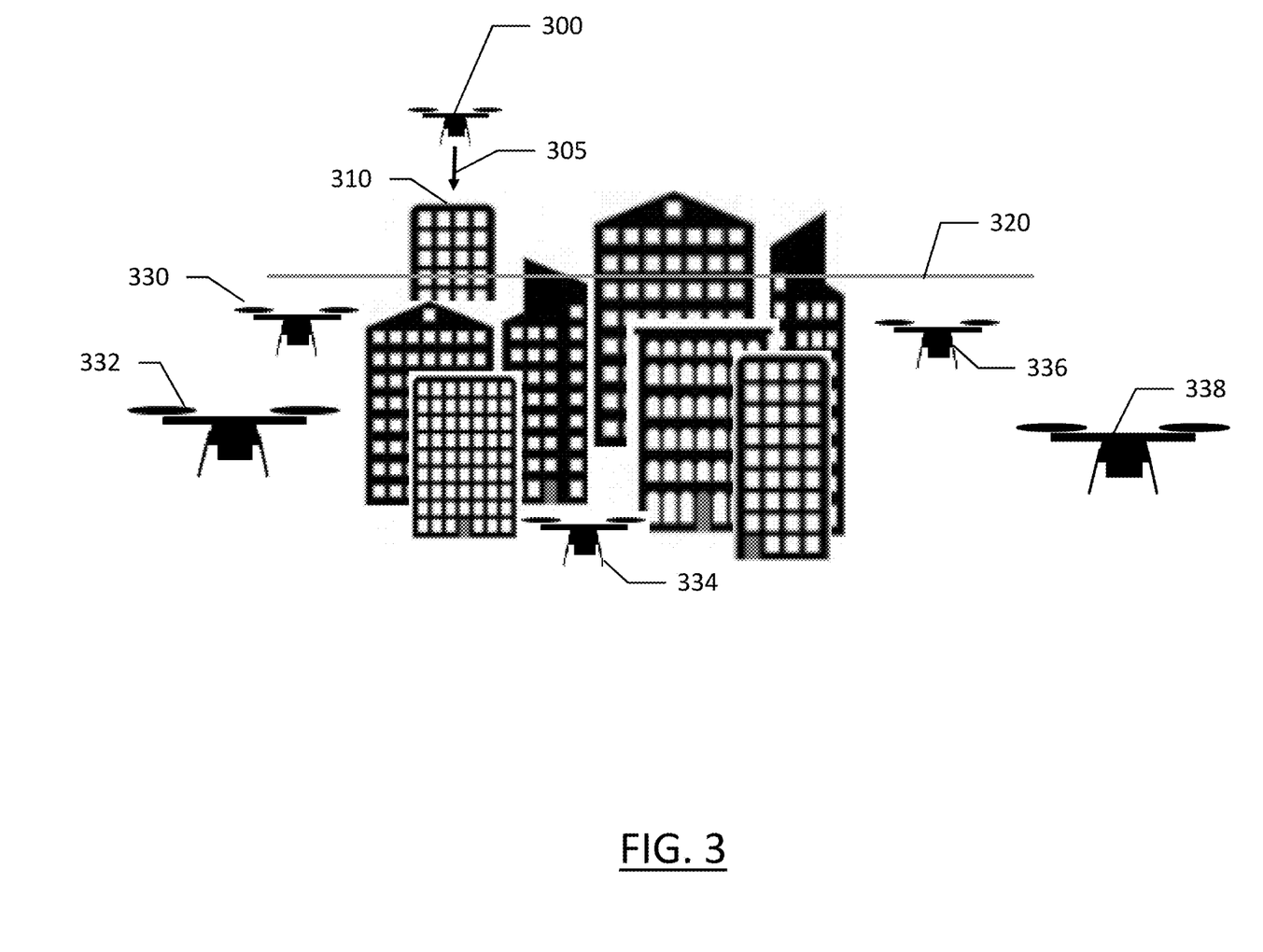
FIG. 3 illustrates of a drone preparing for delivery of an article to a target destination of a rooftop of a building in an urban environment according to an example embodiment of the present disclosure.

FIG. 3 illustrates an example embodiment of a drone 300 preparing for delivery of an article to a target destination 310 of a rooftop of a building in an urban environment. The approach of the drone 300 includes a delivery plan whereby the delivery plan includes an approach path 305 (e.g., an approach altitude angle and direction). The drone 300 has a limited view of the target destination 310 and an environment thereof. As the drone 300 comes within a predefined distance of the target destination 310 which may include the distance from the target destination at which time the drone begins the approach, sensor data from other available sensors is sought. The drone 300 reaching the approach may signal to other sensor sources in the vicinity (e.g., within a predefined distance of the target destination) that sensor data is desired relating to the environment of the target destination. While the drone 300 may signal to other sensor sources in the vicinity, a server, such as map services provider 116 may determine that the drone 300 is within a predetermined distance of the target destination 310 and may identify sensor sources proximate the target destination 310 that have a view of the target destination environment. Regardless of whether the drone 300 or a third party (e.g., map service provider 116) identifies sensor sources, the sensor sources may be requested to provide sensor data associated with the environment of the target destination 310.

In the illustrated embodiment of FIG. 3, the sensor sources identified may include other drones such as drones 330, 332, 334, 336, and 338. These additional drones may be performing various functions of their own accord, including being delivery drones, security drones specifically configured to identify threats, monitoring drones to monitor an area, or any other type of drone or drone function. In the illustrated embodiment, the additional drones are all flying below a ceiling represented by line 320. While these additional drones may not have a view of the rooftop target destination 310 itself, they are able to view an environment of the target destination. The additional drones identified as sensor sources may train one or more sensors on the environment of the target destination and provide any sensor data related to the environment of the target destination. The sensor data may be used by the drone 300 or by a service provider (e.g., map services provider 116) to determine a conflict with the target destination delivery plan for the article. A conflict may include any of a variety of issues such as obstacles (e.g., another drone, an aerial crane, etc.), threats (e.g., an unauthorized individual detected or unauthorized people are within a predefined distance of the target destination), or any issue that may compromise the delivery of the article or render the article vulnerable to attack, theft, or damage. These obstacles, threats, and other issues are collectively referred to herein as conflicts, where the obstacles, threats, and other issues cause a conflict with the target destination delivery plan.

Conflicts may further include a conflict with an original delivery plan. If an original delivery plan included delivery of an article to a front door of a residence, but sensor from sensor sources (e.g., sensor sources 104) indicates that a garage door of the residence is open. The open garage door provides access to a more secure delivery location such that the open garage door presents a conflict with the original delivery plan. The delivery plan can then be revised to change the delivery target destination from the front door to inside the garage door, provided permission is granted by a recipient to receive deliveries within the garage. This permission may be real-time, where upon detection of the conflict, the recipient is notified of the conflict and offered one or more changes to the delivery plan, which in this case includes delivery within the garage. Optionally, a recipient may have a profile accessible to the service provider operating the drone and the recipient's profile may indicate a prior authorization for delivery within the garage. Further, a recipient's profile may include two or more delivery target destination locations at their residence, and may include an order of preference. In the aforementioned embodiment, a recipient may indicate that inside of their garage may be their preferred target destination in the event the garage door is open, with a front step being a preferred target destination in the event the garage door is closed.

Another example of a conflict may include where a recipient is present in the back yard of their residence, while the target destination is the front door of their residence. Sensor data from the at least one sensor source proximate the residence may alert the delivery drone of the conflict where the recipient is outdoors and available. The delivery plan may then be changed based on the conflict to deliver the article to the recipient in the back yard of the residence. When delivering to a person, facial recognition may be employed to ensure delivery is made to the intended recipient. Facial recognition failing to identify the correct recipient may identify an approved surrogate of the recipient's profile or alert the intended recipient of the person identified at the target destination to offer an option to the recipient to deliver or to withhold the article.

When a conflict is identified with the target destination delivery plan for an article, countermeasures may be taken by the drone 300. These countermeasures may be established by the drone 300 itself, by a service provider (e.g., map services provider 116), or by a sensor source that is able to identify a corrective action. The countermeasures include a change to the target destination delivery plan, where the change may include a revised approach (e.g., angle or direction of approach and landing), a revised target destination, a revised delivery schedule, or any change to the original target delivery plan.

The embodiment of FIG. 3 illustrates sensor sources proximate the target destination 310 including a plurality of additional drones; however, each of the additional drones are below the ceiling line 320. While these additional drones may function as sensor sources providing useful sensor information, visibility may be obstructed or lost by the additional drones because of the altitude and the line-of-sight of these additional drones. If the ceiling line 320 is raised and drones can operate above this line, the additional drones may be better positioned to provide better information or sensor data relating to the target destination. Drones operating at higher altitudes have a different vantage point of the environment including an environment of the target destination. Drones operating at higher altitudes may provide benefits for higher-altitude deliveries, for example.

Figure 4:
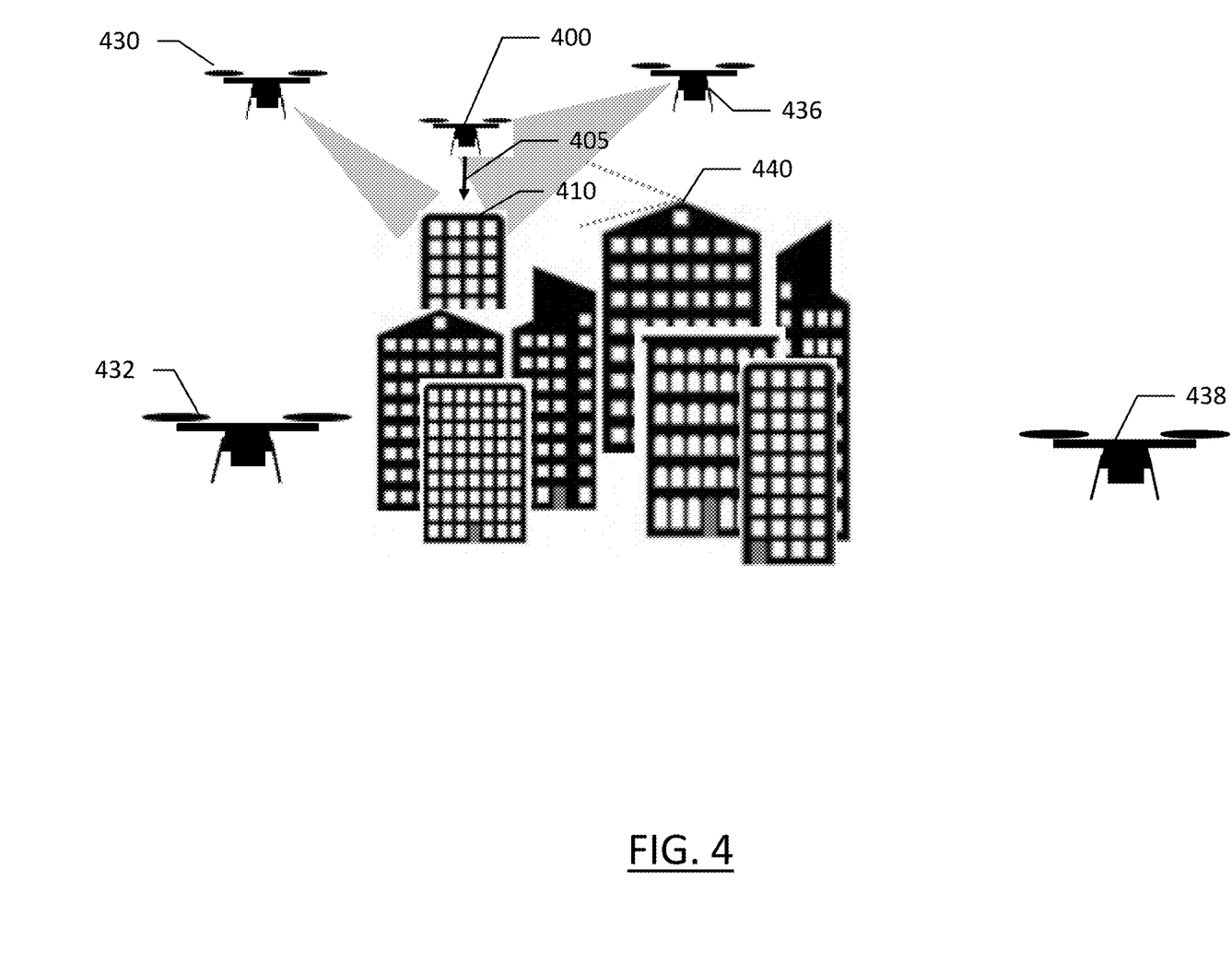
FIG. 4 illustrates a drone beginning an approach along a path to target destination according to an example embodiment of the present disclosure.

FIG. 4 illustrates an example embodiment in which drone 400 is beginning an approach along path 405 to target destination 410, and sensor sources include additional drones 430 and 436, each with an improved vantage viewpoint of the target destination and the environment thereof. These additional drones 430 and 436 are better able to identify conflicts with the delivery plan of the drone 400 than are additional drones 432 and 438 that are located further from the target destination and at a lower altitude. The conflict identified may be communicated to recommend or suggest an optimal landing area for the drone 400 that may be somewhat different than the originally planned landing area at the target destination. The drone 400, an operator thereof, or a service provider operating the drone may be alerted to a potential threat or hazard based on the vantage point of the additional drones 430 and 436. A conflict may optionally be identified based on known or verified threats or hazards in the area of the target destination based on real-time and/or historical data. For example, a delivery target destination may be proximate a hospital where a Med-Evac helicopter flies in and out of with great regularity. The drone 400 may be alerted to this potential or imminent hazard as a conflict to the delivery at the target destination, and a change to the delivery plan may be made accordingly.

While the illustrated embodiments of FIGS. 3 and 4 depict additional drones as sensor sources, other sensor sources may include sensors such as cameras, proximity sensors, motion detectors, etc. that may be in fixed locations, such as mounted to a building. FIG. 4 illustrates such a sensor source 440 atop a building of the urban environment with a vantage view represented by dashed lines emanating from the sensor source 440.

The illustrated embodiments of FIGS. 3 and 4 represent urban environments and depict target destinations atop buildings. However, embodiments described herein may be implemented in any environment, whether urban, suburban, or rural. Delivery drones may be employed for delivering to residential homes and placing an article for delivery on a doorstep, for example. Such an environment is considerably different than that of a rooftop; however, embodiments are also well-suited for this type of delivery. A drone delivering an article to a target destination of a home in a suburban neighborhood may have a target destination of the front step or front porch of the home. Upon approach, when the drone comes within a predetermined distance of the target destination, sensor sources may be identified to facilitate the delivery plan for the article.

Additional drones may be less common in areas of lower population density, such as in suburban areas. However, other sensor sources exist that can be employed to assist a drone in completing delivery of an article according to a delivery plan. For example, as a drone approaches a home to deliver an article to the front step of the home, a sensor source may be identified to include a security camera of the home that has the front step in the field of view. The sensor source may identify movement on the front step, such as an animal or a person, and may alert the drone of the conflict with the delivery plan. The drone may then alter the delivery plan such as by delaying delivery (e.g., waiting until the front step is clear) or altering the target destination (e.g., delivering the article to the back step of the home).

Sensor sources are becoming ubiquitous as sensor technology becomes less expensive and more capable. Sensors exist in many places in populated areas already, and more sensors are being implemented regularly. Further, drone presence is increasing and the availability of drones proximate a target destination is ever-increasing. While a drone may be able to identify sensor sources that are affiliated with the drone (e.g., additional drones from the same company), identifying sensor sources and having the sensor sources collaborate with the drone may present a challenge. To solve this challenge, sensor sources may be incentivized to participate in collaboration with delivery drones.

Sensor sources for collaborating with delivery drones may include a third-party monitoring company that specializes in facilitating the delivery of articles. Such third-parties may operate based on compensation models, such as receiving payments or micro-payments for each collaboration they provide when their sensors are used to provide support for a delivery drone. Such an entity may employ a plurality of additional drones used to patrol deliveries, and/or such entities may establish a network of sensors around an area to provide monitoring of delivery target destinations, for example. Beyond specifically designated monitoring entities, sensor sources may include sensor arrays that are already available, but generally used for different purposes. For example, a competing delivery service may operate a fleet of delivery drones in an area. When a drone is approaching a target destination, delivery drones of the competing delivery service may be identified as sensor sources. The competing delivery service delivery drones may collaborate with the drone and by doing so may earn credit (e.g., financial or otherwise) toward an agreement with the delivery service of the drone. This symbiotic relationship may benefit all delivery services, and a credit exchange for providing sensor sources may ensure equality among service providers between what they provide and what they receive in terms of sensor source information.

The identification of sensor sources may be performed based on a priority or hierarchy. Sensor sources may be afforded a weight based on one or more factors influencing their potential effectiveness and efficiency (temporally and cost) for delivering sensor data relative to the target destination. Weighting factors may include, for example, proximity to the target destination, the capabilities of the sensors or sensor array of the sensor source, cost or contractual obligation to the sensor source for providing sensor data, vantage view point of a respective sensor source (e.g., altitude, unobstructed view, etc.), or other factors that influence the quality of sensor data available from a sensor source. Identification of sensor sources may limit the number of sensor sources used to a predetermined number of sensor sources. Optionally, the identification of sensor sources may limit the sensor sources to those having at least a predefined level of sensor capabilities. Optionally, the identification of sensor sources may limit the sensor sources to identify a particular diversity of sensor sources, such as sensor sources from at least two distinct vantage points separated by at least a predetermined distance or angle relative to the target destination.

Figure 5:
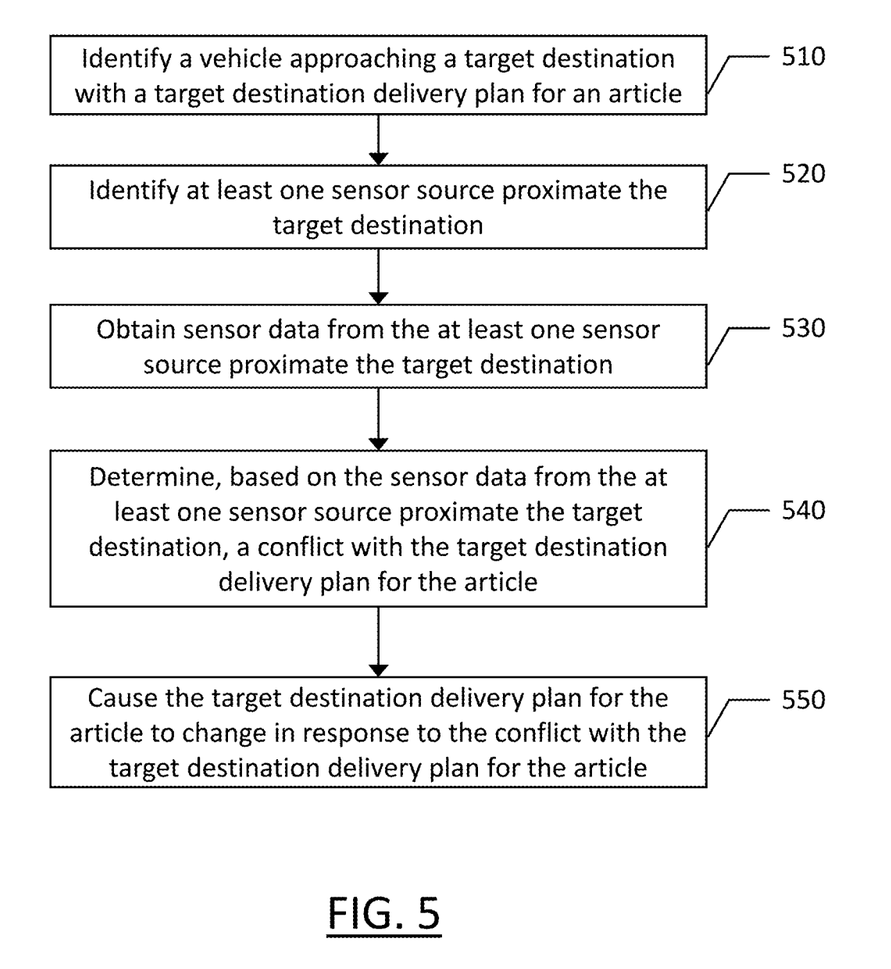
FIG. 5 is a flowchart of a method for soliciting sensor data from sensor sources having the target destination within their field of view to identify conflicts with an approach plan to the target destination according to an example embodiment of the present disclosure.

FIG. 5 illustrates a flowchart of a method according to an example embodiment of the present disclosure. It will be understood that each block of the flowchart and combination of blocks in the flowchart may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems that perform the specified functions, or combinations of special purpose hardware and computer instructions.

FIG. 5 illustrates a flowchart of a method according to an example embodiment of the present disclosure for using sensor sources near a target destination to identify conflicts with an approach plan to the target destination, and more particularly, to soliciting sensor data from sensor sources having the target destination within their field of view to identify conflicts with an approach plan to the target destination. As shown at 510, a vehicle is identified approaching a target destination with a target destination delivery plan. The vehicle may include an aerial drone having an article for delivery to the target destination. The target destination delivery plan may include an approach path and a location at which an article is to be delivered. At least one sensor source is identified at 520 proximate the target destination. The at least one sensor source may be identified in response to the vehicle coming within a predetermined distance or within a predetermined time of arrival at the target destination. Once the vehicle is within the predetermined distance or within the predetermined time of arrival, at least one sensor source may then be identified. The sensor source may include static or dynamic sensors that may be stationary or mobile. Sensor sources may include additional drones proximate the target destination that have a vantage view of the target destination and/or the target destination environment. Sensor data is obtained at 530 from the at least one sensor source proximate the target destination. Based on the sensor data from the at least one sensor source proximate the target destination, a conflict is determined with the target destination delivery plan for the article at 540. The target destination delivery plan for the article is caused to change at 550 in response to the conflict with the target destination delivery plan for the article. The change may include a temporal delay in delivery or may include changing a target destination for the delivery, for example.

In an example embodiment, an apparatus for performing the method of FIG. 5 above may comprise a processor (e.g., the processor 202) configured to perform some or each of the operations (510-550) described above. The processor may, for example, be configured to perform the operations (510-550) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 510-550 may comprise, for example, the processor 202 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising processing circuitry and at least one memory including computer program code, the at least one memory and the computer program code configured to, with the processing circuitry, cause the apparatus to at least:
    identify a vehicle approaching a target destination with a target destination delivery plan for an article;
    identify at least one sensor source proximate the target destination, wherein the at least one sensor source proximate the target comprises an aerial drone closer to the target destination than the vehicle;
    obtain sensor data from the at least one sensor source proximate the target destination;
    determine, based on the sensor data from the at least one sensor source proximate the target destination, a conflict with the target destination delivery plan for the article;
    cause the target destination delivery plan for the article to change to a new delivery plan in response to the conflict with the target destination delivery plan for the article; and
    cause the vehicle to implement the new delivery plan for the article.

2. The apparatus of claim 1, wherein causing the apparatus to identify the vehicle approaching the target destination comprises causing the apparatus to identify the vehicle coming within a predetermined distance of the target destination.

3. The apparatus of claim 1, wherein the vehicle comprises an aerial drone.

4. The apparatus of claim 1, wherein causing the apparatus to identify the at least one sensor source proximate the target destination comprises causing the apparatus to alert the at least one sensor source proximate the target destination of the target destination and capture sensor data from the at least one sensor source of the target destination and an environment of the target destination.

5. The apparatus of claim 4, wherein causing the apparatus to determine the conflict with the target destination delivery plan for the article comprises causing the apparatus to identify a threat to the vehicle or to the article proximate the target destination.

6. The apparatus of claim 1, wherein causing the apparatus to identify the at least one sensor source proximate the target destination comprises causing the apparatus to identify at least one sensor source proximate the target destination having sensor capabilities satisfying predetermined criteria.

7. The apparatus of claim 1, wherein causing the apparatus to identify the at least one sensor source proximate the target destination comprises causing the apparatus to identify a plurality of sensor sources proximate the target destination based, at least in part, on the identified plurality of sensor sources providing a plurality of perspectives of the target destination.

8. The apparatus of claim 1, wherein causing the apparatus to obtain sensor data from the at least one sensor source proximate the target destination further comprises causing the apparatus to provide credit to the at least one sensor source proximate the target destination in response to obtaining sensor data from the at least one sensor source proximate the target destination.

9. A computer program product comprising at least one non-transitory computer-readable storage medium having computer-executable program code portions stored therein, the computer-executable program code portions comprising program code instructions configured to:
identify a vehicle approaching a target destination with a target destination delivery plan for an article;
identify at least one sensor source proximate the target destination, wherein the at least one sensor source proximate the target comprises an aerial drone closer to the target destination than the vehicle;
obtain sensor data from the at least one sensor source proximate the target destination;
determine, based on the sensor data from the at least one sensor source proximate the target destination, a conflict with the target destination delivery plan for the article;
cause the target destination delivery plan for the article to change to a new delivery plan in response to the conflict with the target destination delivery plan for the article; and
cause the vehicle to implement the new delivery plan for the article.

10. The computer program product of claim 9, wherein the program code instructions to identify the vehicle approaching the target destination comprise program code instructions to identify the vehicle coming within a predetermined distance of the target destination.

11. The computer program product of claim 9, wherein the vehicle comprises an aerial drone.

12. The computer program product of claim 9, wherein the program code instructions to identify the at least one sensor source proximate the target destination comprise program code instructions to alert the at least one sensor source proximate the target destination of the target destination and capture sensor data from the at least one sensor source of the target destination and an environment of the target destination.

13. The computer program product of claim 12, wherein the program code instructions to determine the conflict with the target destination delivery plan for the article comprise program code instructions to identify a threat to the vehicle or to the article proximate the target destination.

14. The computer program product of claim 9, wherein the program code instructions to identify the at least one sensor source proximate the target destination comprise program code instructions to identify at least one sensor source proximate the target destination having sensor capabilities satisfying predetermined criteria.

15. The computer program product of claim 9, wherein the program code instructions to identify the at least one sensor source proximate the target destination comprise program code instructions to identify a plurality of sensor sources proximate the target destination based, at least in part, on the identified plurality of sensor sources providing a plurality of perspectives of the target destination.

16. The computer program product of claim 9, wherein the program code instructions to obtain sensor data from the at least one sensor source proximate the target destination further comprises program code instructions to provide credit to the at least one sensor source proximate the target destination in response to obtaining sensor data from the at least one sensor source proximate the target destination.

17. A method comprising:
identifying a vehicle approaching a target destination with a target destination delivery plan for an article;
identifying at least one sensor source proximate the target destination, wherein the at least one sensor source proximate the target comprises an aerial drone closer to the target destination than the vehicle;
obtaining sensor data from the at least one sensor source proximate the target destination;
determining, based on the sensor data from the at least one sensor source proximate the target destination, a conflict with the target destination delivery plan for the article;
causing the target destination delivery plan for the article to change to a new delivery plan in response to the conflict with the target destination delivery plan for the article; and
cause the vehicle to implement the new delivery plan for the article.

18. The method of claim 17, wherein identifying the vehicle approaching the target destination comprises identifying the vehicle coming within a predetermined distance of the target destination.

19. The method of claim 17, wherein identifying the at least one sensor source proximate the target destination comprises alerting the at least one sensor source proximate the target destination of the target destination and capturing sensor data from the at least one sensor source of the target destination and an environment of the target destination.

20. The method of claim 19, wherein determining the conflict with the target destination delivery plan for the article comprises identifying a threat to the vehicle or to the article proximate the target destination.

* * * * *